United States Patent
Zhang et al.

(10) Patent No.: US 10,049,494 B2
(45) Date of Patent: Aug. 14, 2018

(54) METHOD AND SYSTEM FOR PERFORMING INTERACTION BASED ON AUGMENTED REALITY

(71) Applicant: TENCENT TECHNOLOGY (SHENZHEN) COMPANY LIMITED, Guangdong (CN)

(72) Inventors: Zhenwei Zhang, Guangdong (CN); Ling Wang, Guangdong (CN); Fen Xiao, Guangdong (CN); Zhehui Wu, Guangdong (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 14/371,996

(22) Filed: Jul. 11, 2014

(65) Prior Publication Data
US 2015/0187142 A1 Jul. 2, 2015

Related U.S. Application Data

(63) Continuation of application No. PCT/CN2013/089651, filed on Dec. 17, 2013.

(30) Foreign Application Priority Data

Jan. 25, 2013 (CN) .......................... 2013 1 0030109

(51) Int. Cl.
*G06T 19/00* (2011.01)
*G06T 11/00* (2006.01)
*G06K 9/00* (2006.01)

(52) U.S. Cl.
CPC ........ *G06T 19/006* (2013.01); *G06K 9/00671* (2013.01); *G06T 11/00* (2013.01); *G06T 2207/10004* (2013.01)

(58) Field of Classification Search
CPC ......... G06T 11/00; G06T 15/00; G06T 19/00; G06T 19/006; G06F 3/011; G06F 3/048;
(Continued)

(56) References Cited

U.S. PATENT DOCUMENTS 8,711,176 B2 * 4/2014 Douris ............... G01C 21/3602
345/158
9,410,810 B2 * 8/2016 Lee .......................... G01C 21/20
(Continued)

FOREIGN PATENT DOCUMENTS

CN 101833896 A 9/2010
CN 101904185 A 12/2010
(Continued)

OTHER PUBLICATIONS

International Search Report from International Application No. PCT/CN2013/089651, dated Apr. 3, 2014.

*Primary Examiner* — Sae Won Yoon
(74) *Attorney, Agent, or Firm* — Morgan, Lewis & Bockius LLP

(57) ABSTRACT

A method for performing interaction based on augmented reality is provided. The method includes obtaining an image of a real scene photographed by a first terminal; obtaining a first location of the first terminal and a second location of a second terminal, the first location including geographical coordinate and orientation of the first terminal; matching the first location with the second location; displaying, on the image of the real scene photographed by the first terminal, information of successfully matched second terminal; and interacting according to the displayed information of the second terminal. By the method, an image is formed by photographing a real scene, and information of the successfully matched second terminal is displayed on the image of the real scene photographed by the first terminal; then
(Continued)

interactions are performed according to needs. Furthermore, a system for performing interaction based on augmented reality is provided.

7 Claims, 6 Drawing Sheets

(58) Field of Classification Search
CPC ............... G06F 3/04817; G06F 9/4443; G06F 2203/04802; G02B 27/017
USPC .......................................................... 345/633
See application file for complete search history.

(56) References Cited

U.S. PATENT DOCUMENTS

| | | | | |
|---|---|---|---|---|
| 2005/0206654 | A1* | 9/2005 | Vaha-Sipila | G01C 21/20 345/632 |
| 2010/0081416 | A1* | 4/2010 | Cohen | G06F 17/30041 455/414.1 |
| 2011/0037712 | A1* | 2/2011 | Kim | H04M 1/7253 345/173 |
| 2011/0071757 | A1* | 3/2011 | Lee | G01C 21/20 701/532 |
| 2011/0141254 | A1* | 6/2011 | Roebke | G06F 17/30041 348/61 |
| 2011/0319131 | A1* | 12/2011 | An | H04N 1/00307 455/556.1 |
| 2012/0003990 | A1* | 1/2012 | Lee | H04L 67/16 455/456.1 |
| 2012/0015730 | A1* | 1/2012 | Watkins, Jr. | A63F 13/12 463/36 |
| 2012/0033070 | A1* | 2/2012 | Yamazaki | G06K 9/00624 348/135 |
| 2012/0148106 | A1* | 6/2012 | Sung | G06T 19/006 382/106 |
| 2012/0158538 | A1* | 6/2012 | Roh | G06Q 30/06 705/26.7 |
| 2012/0176376 | A1* | 7/2012 | Kim | H04W 4/026 345/419 |
| 2012/0256965 | A1* | 10/2012 | Iwami | H04N 21/21805 345/672 |
| 2013/0002489 | A1* | 1/2013 | Erad | H01Q 21/29 342/432 |
| 2013/0142384 | A1* | 6/2013 | Ofek | G06K 9/00771 382/103 |
| 2013/0232422 | A1* | 9/2013 | Yu | G06F 3/0484 715/733 |
| 2013/0250931 | A1* | 9/2013 | Abraham | H04W 8/005 370/338 |
| 2014/0035952 | A1* | 2/2014 | Mikuni | G06T 19/006 345/633 |
| 2014/0066093 | A1* | 3/2014 | Yoo | G01S 5/0072 455/456.1 |
| 2014/0087770 | A1* | 3/2014 | Cho | H04W 4/02 455/457 |
| 2014/0192085 | A1* | 7/2014 | Kim | G06T 19/006 345/633 |
| 2014/0235311 | A1 | 8/2014 | Weising et al. | |
| 2015/0002808 | A1* | 1/2015 | Rizzo, III | A61F 9/08 351/158 |

FOREIGN PATENT DOCUMENTS

| | | |
|---|---|---|
| CN | 102123194 | 7/2011 |
| CN | 102495959 | 6/2012 |
| CN | 102884490 | 1/2013 |
| CN | 103105993 A | 5/2013 |

\* cited by examiner

METHOD AND SYSTEM FOR PERFORMING INTERACTION BASED ON AUGMENTED REALITY

CROSS REFERENCE TO RELATED APPLICATIONS

This application is a continuation application of the PCT International Application No. PCT/CN2013/089651, filed on Dec. 17, 2013, entitled "METHOD AND SYSTEM FOR PERFORMING INTERACTION BASED ON AUGMENTED REALITY" by Zhenwei ZHANG, Ling WANG, Fen XIAO and Zhehui WU, which claims the priority from the Chinese patent application No. CN 201310030109.5, filed on Jan. 25, 2013. The above-referenced applications are hereby incorporated herein in their entireties by reference.

FIELD OF THE INVENTION

The present disclosure relates generally to the field of information technology, and more particularly to a method and system for performing interaction based on the augmented reality technology.

BACKGROUND OF THE INVENTION

Augmented reality, also referred to as mixed reality, is a new technology developed based on virtual reality. It can increase user's perception of the real world by using information provided by computer system, applying virtual information to the real world, and superimposing computer-generated virtual objects, scenes or system prompts to the real scene, so as to achieve augmentation of reality. The user can not only feel through the virtual reality system the immersive realism experienced in the objective physical world, but also be able to break through the space, time and other objective constraints to have personal experience that would be less possible to happen in the real world. Currently, the technology of augmented reality has been used in navigation, information inquiry and entertainment, etc. For example, by augmented reality, the user can obtain business information or play entertainment animation, and information including the current location, nearby restaurants, tourist attractions and bus stations, etc., can also be displayed to the user.

However, the application of augmented reality has been limited so far, for it only allows providing information unidirectionally.

SUMMARY OF THE INVENTION

To address the aforementioned deficiencies and inadequacies, there is a need to provide a method and system for performing interaction based on augmented reality.

According to one aspect of the disclosure, a method for performing interaction based on augmented reality includes the steps of:
obtaining an image of a real scene photographed by a first terminal;
obtaining a first location of the first terminal and a second location of a second terminal, the first location including geographical coordinate and orientation of the first terminal;
matching the first location with the second location;
displaying, on the image of the real scene photographed by the first terminal, information of the second terminal if the first location is successfully matched with the second location; and
performing interaction according to the displayed information of the second terminal.

According to a further aspect of the disclosure, a system for performing interaction based on augmented reality includes:
an image obtaining module, configured to obtain an image of a real scene photographed by a first terminal;
a location obtaining module, configured to obtain a first location of the first terminal and a second location of a second terminal;
a matching module, configured to match the first location with the second location, the first location including geographical coordinate and orientation of the first terminal;
a displaying module, configured to display, on the image of the real scene photographed by the first terminal information, information of the second terminal if the first location is successfully matched with the second location;
an interacting module, configured to perform interaction according to the displayed information of the second terminal.

By the above method and system, an image is formed by photographing a real scene, and information of the successfully matched second terminal is displayed on the image of the real scene photographed by the first terminal; then interactions are performed according to needs. By displaying virtual second terminals on the image of the real scene in accordance with their geographical locations in the real world, interaction with the second terminals is facilitated. Thus, a user can communicate with a surrounding user holding a second terminal, and also obtain the specific geographical position of the second terminal.

DETAILED DESCRIPTION OF THE PREFERRED EMBODIMENTS

In the following description of embodiments, reference is made to the accompanying drawings which form a part hereof, and in which it is shown by way of illustration specific embodiments of the disclosure that can be practiced. It is to be understood that other embodiments can be used and structural changes can be made without departing from the scope of the disclosed embodiments.

Figure 6:
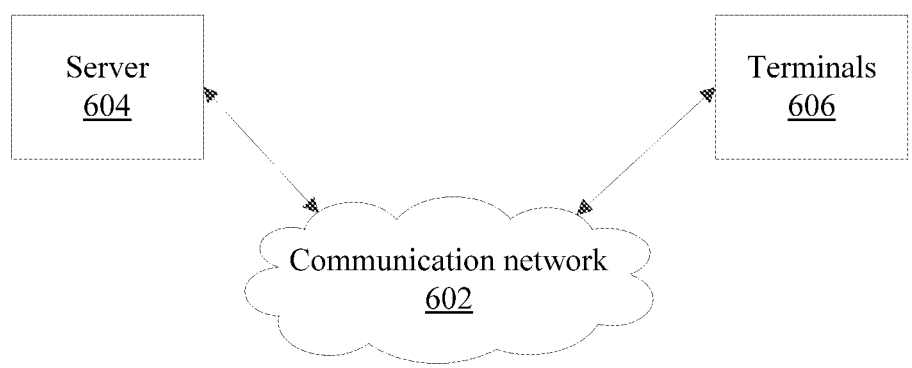
FIG. 6 depicts an exemplary environment incorporating certain disclosed embodiments.

FIG. 6 depicts an exemplary environment 600 incorporating exemplary methods and systems for performing interaction based on the augmented reality technology in accordance with various disclosed embodiments. As shown in FIG. 6, the environment 600 can include a server 604, terminals 606 (e.g., a first terminal, a second terminal), and a communication network 602. The server 604 and the terminals 606 may be coupled through the communication network 602 for information exchange including, e.g., obtaining a first location of the first terminal and a second location of a second terminal, matching the first location with the second location, etc. It is to be understood that any number of terminals 606 or servers 604 may be included, and other devices may also be included.

The communication network 602 may include any appropriate type of communication network for providing network connections to the server 604 and terminals 606 or among multiple servers 604 or terminals 606. For example, the communication network 602 may include the Internet or other types of computer networks or telecommunication networks, either wired or wireless.

A terminal, as used herein, may refer to any appropriate user terminal with certain computing capabilities, e.g., a hand-held computing device (e.g., a tablet), a mobile terminal (e.g., a mobile phone or a smart phone), or any other client-side computing device.

A server, as used herein, may refer to one or more server computers configured to provide certain server functionalities, e.g., receiving report information, data collecting, data searching, sending feedback information/alert messages, process rewards/punishments for users, etc. A server may also include one or more processors to execute computer programs in parallel.

Figure 7:
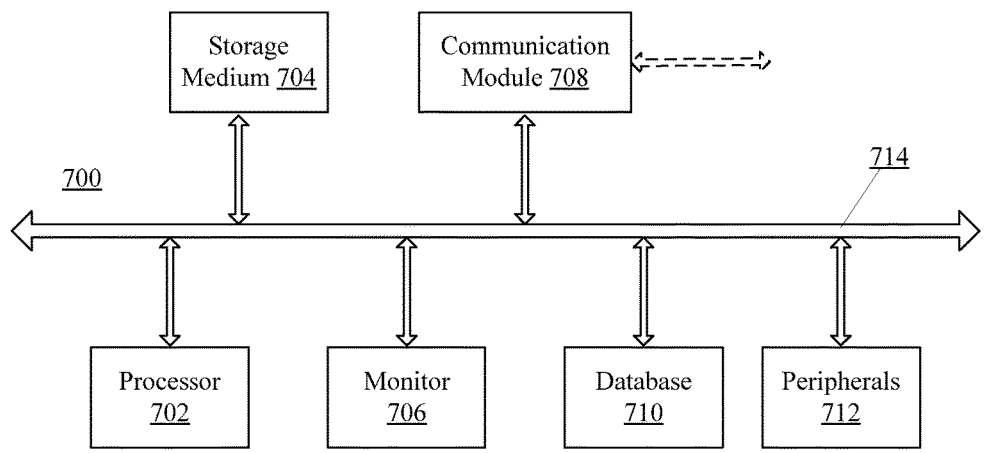
FIG. 7 depicts an exemplary computing system consistent with the disclosed embodiments.

The server 604 and the terminals 606 may be implemented on any appropriate computing platform. FIG. 7 shows a block diagram of an exemplary computing system 700 (or computer system 700) capable of implementing the server 604 and/or the terminals 606. As shown in FIG. 7, the exemplary computer system 700 may include a processor 702, a storage medium 704, a monitor 706, a communication module 708, a database 710, peripherals 712, and one or more bus 714 to couple the devices together. Certain devices may be omitted and other devices may be included.

The processor 702 can include any appropriate processor or processors. Further, the processor 702 can include multiple cores for multi-thread or parallel processing. The storage medium 704 may include memory modules, e.g., Read-Only Memory (ROM), Random Access Memory (RAM), and flash memory modules, and mass storages, e.g., CD-ROM, U-disk, removable hard disk, etc. The storage medium 704 may store computer programs for implementing various processes (e.g., obtaining an image of a real scene photographed by a first terminal, obtaining a first location of the first terminal and a second location of a second terminal, matching the first location with the second location, displaying, on the image of the real scene photographed by the first terminal, information of the second terminal if the first location is successfully matched with the second location; and performing interaction according to the displayed information of the second terminal, based on the augmented reality technology, etc.), when executed by the processor 702.

The monitor 706 may include display devices for displaying contents in the computing system 700, e.g., displaying report information or game interface. The peripherals 712 may include I/O devices such as keyboard and mouse.

Further, the communication module 708 may include network devices for establishing connections through the communication network 602. The database 710 may include one or more databases for storing certain data and for performing certain operations on the stored data, e.g., storing abnormal data, user IDs, and corresponding relationship(s) there between, or any other suitable data searching and management operations.

In operation, the terminals 606 may cause the server 604 to perform certain actions, e.g., obtaining a first location of the first terminal and a second location of a second terminal, matching the first location with the second location, etc. The server 604 may be configured to provide structures and functions for such actions and operations.

In various embodiments, a terminal involved in the disclosed methods and systems can include the terminals 606, while a server involved in the disclosed methods and systems can include the server 604. The methods and systems disclosed in accordance with various embodiments can be executed by a computer system. In one embodiment, the disclosed methods and systems can be implemented by a server.

Various embodiments provide methods and systems for performing interaction based on the augmented reality technology. The methods and systems are illustrated in various examples described herein.

Figure 1:
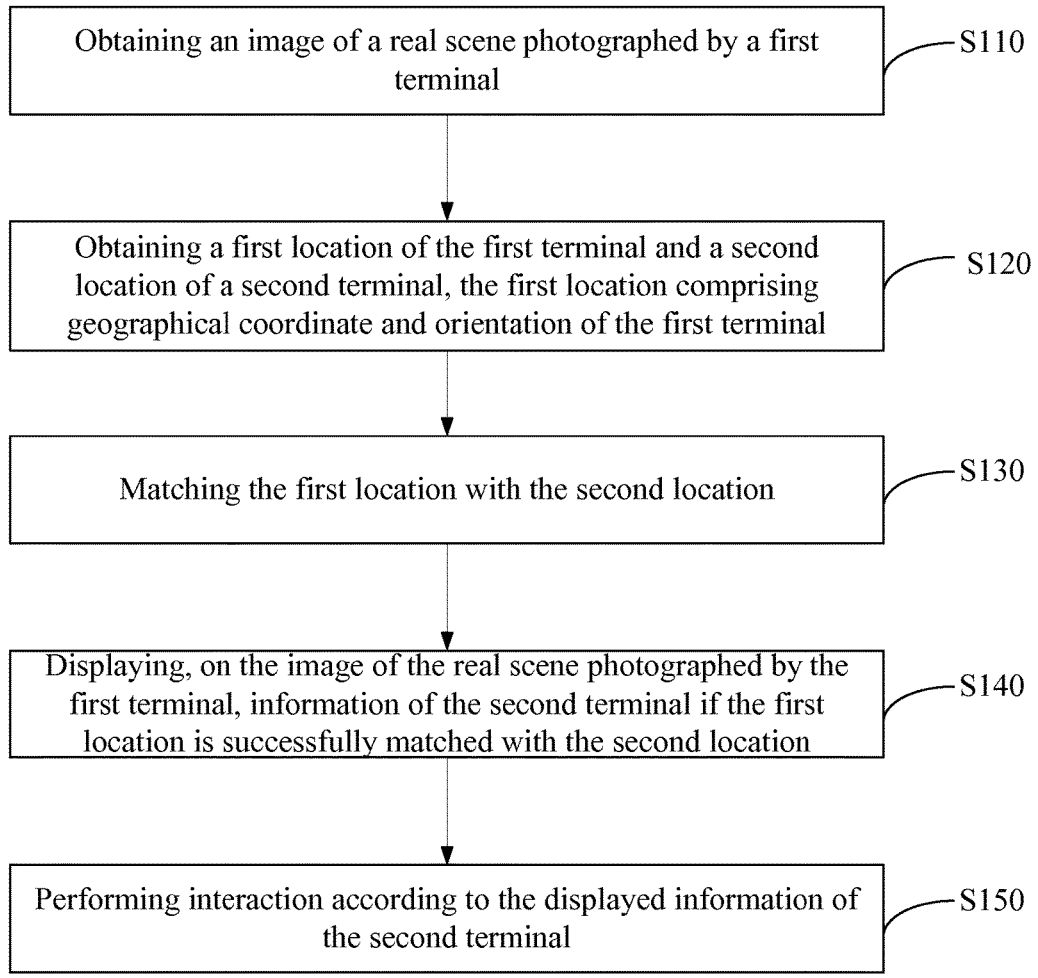
FIG. 1 is a diagram showing a method for performing interaction based on augmented reality in one embodiment of the present disclosure.

FIG. 1 is a diagram showing a method for performing interaction based on augmented reality in one embodiment of the present disclosure. The method includes the following steps.

Step S110, obtaining an image of a real scene photographed by a first terminal.

By the method, the camera of the first terminal is automatically opened to photograph the real scene it faces, and the image of the real scene is displayed on a display of the first terminal. The display range of the image of the real scene is determined by the photographing range of the camera of the first terminal. When the photographing parameters, such as zoom, orientation and tilt angle of camera lens, etc., are adjusted by the user, the image of the real scene photographed may change accordingly.

Step S120, obtaining a first location of the first terminal and a second location of a second terminal, the first location including geographical coordinate and orientation of the first terminal.

The first terminal may be a mobile phone, tablet computer, notebook computer, e-reader, smart watch, smart window, etc. The location information of the first terminal may include geographical coordinate and orientation of the first terminal. Information of the geographical coordinate can be obtained by the Global Positioning System (GPS) of the first terminal, or by other means such as the Beidou Satellite navigation system and base station positioning, etc. When the first terminal is a mobile phone, the service of base station positioning provided to the mobile phone user is called mobile phone base station positioning service, also referred to as Location Based Service (LBS). LBS enables obtaining the location (including the geographical coordinate) of the mobile terminal user over a network (such as GSM network) of telecom mobile operator. The orientation of the first terminal may be identified by an electronic compass of the first terminal. Under the effect of magnetic field, the needle of the electronic compass is retained in the tangential direction of the magnetic meridian and pointing to North geographic pole. This can be used for identifying a direction. For example, when the first terminal is a pair of smart eye glasses, a smart watch, or smart car equipment, it is possible to determine the orientation of the camera by the electronic compass. In case the camera and the display of the first terminal are separated, the orientation of the first terminal will be determined by the orientation of the camera.

Data of the second location of the second terminal comes from a back-end database. When the first terminal is opened, the second location of the second terminal will be searched for in the back-end database over GPRS or 3G and WLAN network, etc. The back-end database may include information of geographical position of all second terminals, frequently contacted second terminals, or second terminals of certain groups. Specific limitations may be set during searching, for example, second terminals within a certain angle degree and 10 km from the first terminal.

Step S130, matching the first location with the second location.

The distance between the first terminal and the second terminal, and orientation relationship thereof are calculated according to the first location of the first terminal and the second location of the second terminal. After that, determine if the distance and the orientation meet preset requirements. If the distance of the second terminal to the first terminal and orientation relationship thereof meet the preset requirements, it is determined that the second terminal successfully matches the first terminal. In this embodiment, the preset requirements include that the distance meets a first preset value, and that deviation of the position of the second terminal to the orientation of the first terminal meets a second preset value.

The first preset value and the second preset value may be predetermined, or automatically adjusted according to the tilt angle of the first terminal or camera parameters (for example, focal length, field angle etc.) of the first terminal (for wide-angle lens, the second preset value may be adjusted to be larger; if the first terminal switches from vertical orientation to horizontal orientation, then the first preset value may be adjusted to be smaller, while the second preset value to be larger), or according to a combination of the tilt angle and camera parameters of the first terminal. This is similar to custom setting by the user according to actual needs. In other embodiments, the preset requirement can only include that deviation of the position of the second terminal to the orientation of the first terminal meets a second preset value.

Figure 2:
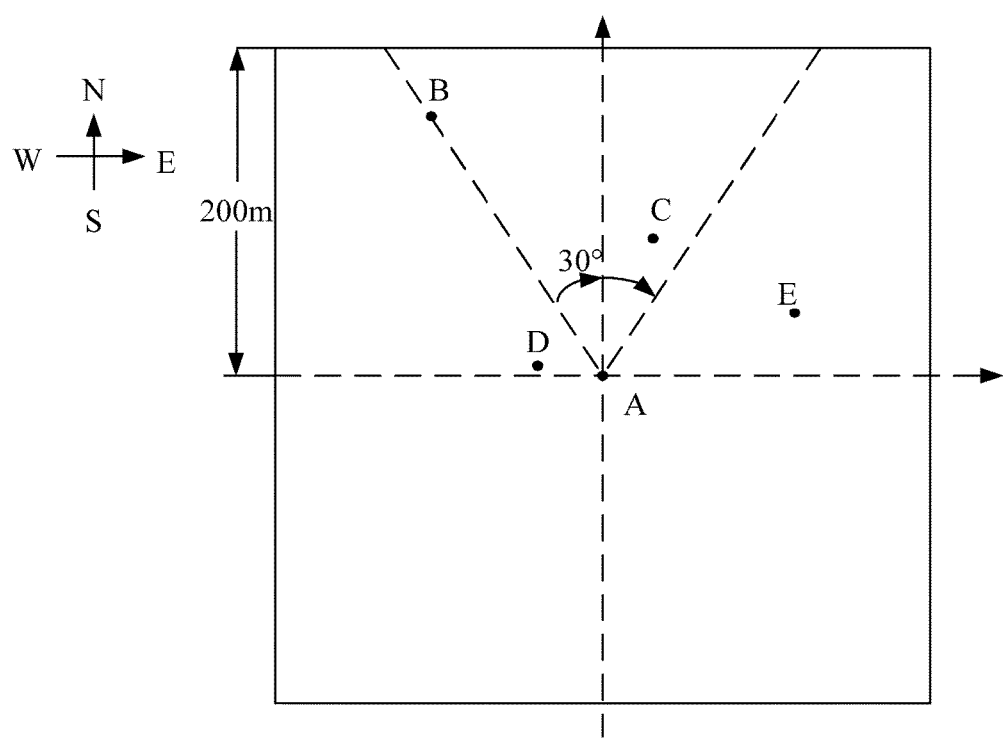
FIG. 2 is a schematic diagram showing relationship of relative positions of the second terminals and a first terminal in one embodiment of the present disclosure.

For example, when it determined that the first terminal is facing north, and the deviation of the position of the second terminal to the orientation of the first terminal, i.e., the second preset value, is 30°, then second terminals that are located within the range of 30° north by east and 30° north by west will be determined as successfully matched second terminals. The following examples illustrate the cases when the distance meets the first preset value, and the deviation of the position of the second terminal to the orientation of the first terminal meets the second preset value. As shown in FIG. 2, in real world, the first terminal is located at point A and facing north. The second terminal B is located at a point B; the distance between A and B is 170 m, and B is in the direction of 30° north by west. The second terminal C is located at a point C; the distance between A and C is 80 m, and C is in the direction of 15° north by east. The second terminal D is located at a point D; the distance between A and D is 20 m, and D is in the direction of 80° north by west. The second terminal E is located in at a point E; the distance between A and E is 120 m, and E is in the direction of 70° north by east.

It can be seen that the deviation of B to the orientation of the first terminal is 30°, the deviation of C to the orientation of the first terminal is 15°, the deviation of D to the orientation of the first terminal is 80°, and the deviation of E to the orientation of the first terminal is 70°. When the first preset value is 200 m, and the second preset value is 35°, it can be calculated that the distance and orientation deviation of the second terminals B and C to the first terminal meet the preset requirements, and thus the second terminals B and C successfully matches the first terminal. By filtering rules set according to preset requirements, the second terminals are filtered, with nearby second terminals meeting the requirements displayed. This ensures as much as possible that second terminals within the range of the real image will be determined as successfully matched second terminals.

Step S140: displaying, on the image of real scene photographed by the first terminal, information of the successfully matched second terminal.

Information of the second terminal successfully matching the first terminal is displayed on the image of real scene. By the above filtering and matching process, second terminals that meet the preset requirements are displayed on the image. This avoids the situation that a page is filled with a huge amount of information, thus improves system operation speed and saves network data flow. Information of the second terminals displayed on the image is distributed according to the relationship between the second locations of the second terminals and the first location of the first terminal, i.e., the positional relationship of the information of the second terminals displayed on the image correspond with the positional relationship of the second terminals in the real world. This may facilitate the user in quickly getting the position of the second terminals in real world.

It is possible to distribute the information of the second terminals on the image in a way corresponding to the relationship of distance and angular deviation between the second terminals and the first terminal, with the central point of the image set as basic point, when the relationship between the second location of the second terminal and the first location of the first terminal meets the distance requirement set by a first preset value, and the deviation of the second location of the second terminal to the orientation of the first terminal meets a second preset value. In other embodiments, when there is only the requirement that the deviation to the orientation to the first terminal meets a second preset value, the information of the second terminals displayed on the image will only have to correspond to the relationship of angular deviation.

Figure 3:
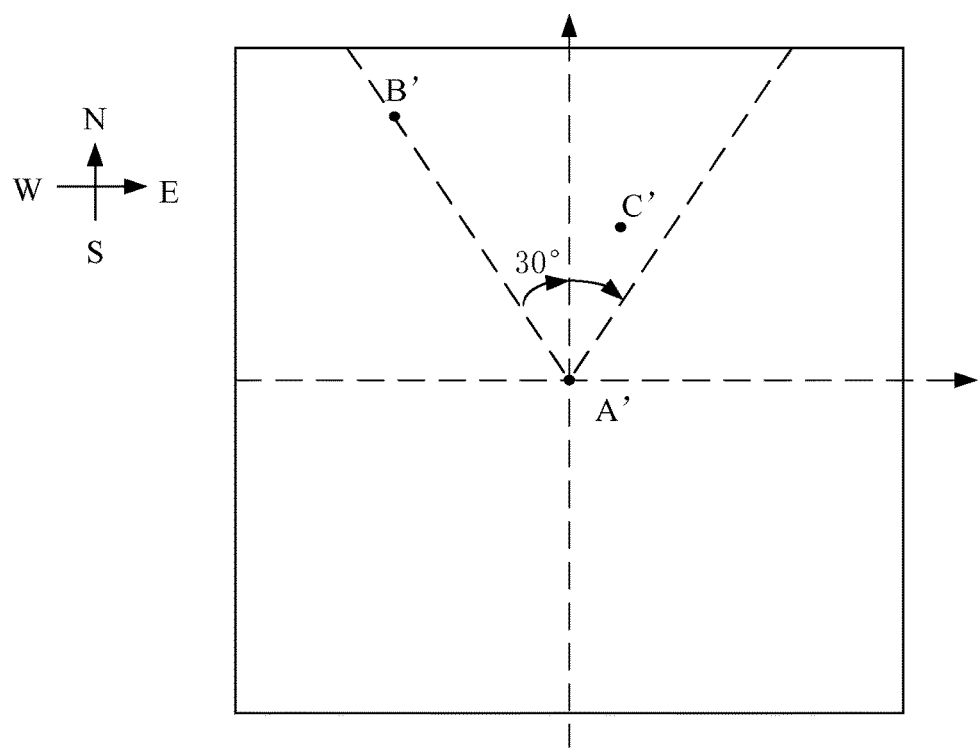
FIG. 3 is a schematic diagram showing relationship of relative positions of the second terminals and the first terminal of FIG. 2, wherein the second terminal is successfully matched with the first terminal.

The following examples illustrate the cases when the distance meets the first preset value, and the deviation to the orientation of the first terminal meets the second preset value. From FIG. 2 and the above preset requirements, it can be seen that the second terminals B and C successfully match the first terminal. FIG. 3 shows the positional relationship between the information of the second terminals B and C displayed on the image, in which the point A' is the location of the first terminal, the point B' is the location of the information of the second terminal B, while the point C' is the location of the information of the second terminal C. The positional relationships illustrated correspond with the relative positions of the second terminals and the first terminal in real world.

Furthermore, information of different second terminals may be superimposed onto the image of the real scene in layers, which may overlapped according to the different distances, with information of the second terminal closer to the first terminal positioned as upper layer, and information of the second terminal further from the first terminal positioned as lower layer. This enhances the AR effect, and also provides convenience to subsequent operations. In other embodiments, when the image processing capacity meets requirements, information of different second terminals may be embedded directly into the image.

Step S150: performing interaction according to the displayed information of the second terminal.

The user may select the second terminal to interact with according to the displayed information of the second terminals, including avatar, distance, updates and location, etc. Then, the user may have group activities conveniently and quickly by clicking the avatar of the second terminal, concerning about recent updates of the second terminal, leaving a message or having voice conversation, or viewing the frequent contacting second terminal nearby, so as to set up groups. Upon receiving the command from the user, the first terminal can send text, voice, and video or image message to the corresponding second terminal, so as to realize interaction.

By the above method and system, an image is formed by photographing a real scene, and information of the successfully matched second terminal is displayed on the image; then interactions are performed according to needs. By displaying virtual second terminals on the image of the real scene in accordance with their geographical locations in the real world, interaction with the second terminals is facilitated. Thus, a user can communicate with a surrounding user holding a second terminal, and also obtain the specific geographical position of the second terminal. Fox example, in the team activity, a user will be able to chat with other users holding the second terminals, and to know about the positions of other users in real time, so as to facilitate unified action.

Figure 4:
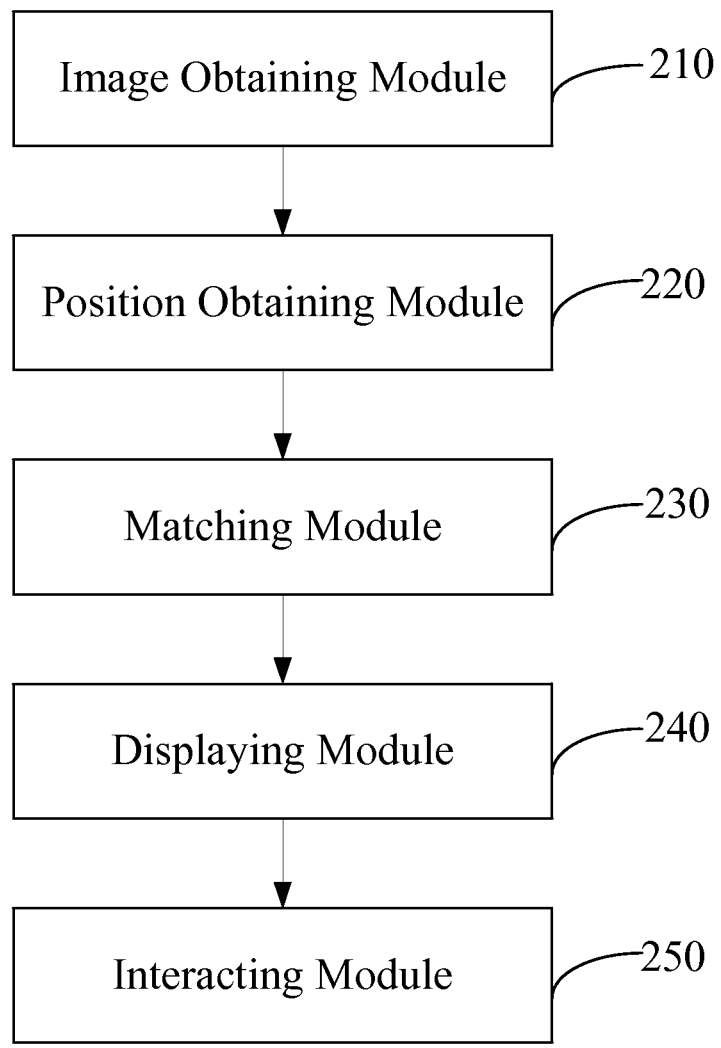
FIG. 4 is a schematic diagram showing modules of a system for performing interaction based on augmented reality in one embodiment of the present disclosure.

Furthermore, as shown in FIG. 4, a system for performing interaction based on augmented reality technology includes an image obtaining module 210, a position obtaining module 220, a matching module 230, a displaying module 240 and an interacting module 250.

The image obtaining module 210 is configured to obtain an image of real scene photographed by a first terminal.

The first terminal has a camera with it. The camera is opened by the image obtaining module 210 to photogragh the real scene that the camera is facing, so as to display an image of the real scene on a display of the first terminal. The range of the displayed image of the real scene is determined by the photograghing range of the camera of the first terminal. When photograghing parameters such as zoom, orientation and tilt angle of camera lens are adjusted by the user, the image of the real scene actually photographed may change accordingly.

The position obtaining module 220 is configured to obtain location information of the first terminal and geographical position of a second terminal.

The first terminal may be a mobile phone, tablet computer, notebook computer, e-reader, smart watch, smart window, etc. The location information of the first terminal may include the geographical coordinate and orientation of the first terminal. The geographical coordinate can be obtained by the obtaining module 220 using the Global Positioning System of the first terminal, or by other means such as the Beidou Satellite navigation system and base station positioning, etc. When the first terminal is a mobile phone, the service of base station positioning provided to the mobile phone user is called mobile phone base station positioning service, also referred to as Location Based Service (LBS). LBS enables obtaining the location (including the geographical coordinate) of the mobile terminal user over a network (such as GSM network) of telecom mobile operator. The orientation of the first terminal may be identified by an electronic compass of the first terminal. Under the effect of magnetic field, the needle of the electronic compass is retained in the tangential direction of the magnetic meridian and pointing to North geographic pole. This can be used for identifying a direction.

Data of the second location of the second terminal comes from a back-end database. When the first terminal is opened, the second location of the second terminal will be searched for in the back-end database via GPRS or 3G and WLAN network, etc. The back-end database may include information of geographical position of all second terminals, frequently contacted second terminals, or second terminals of certain groups. Specific limitations may be set during searching, so as to search for second terminals within for example 10 km from the first terminal.

The matching module 230 is configured to match the first location with the second location.

Figure 5:
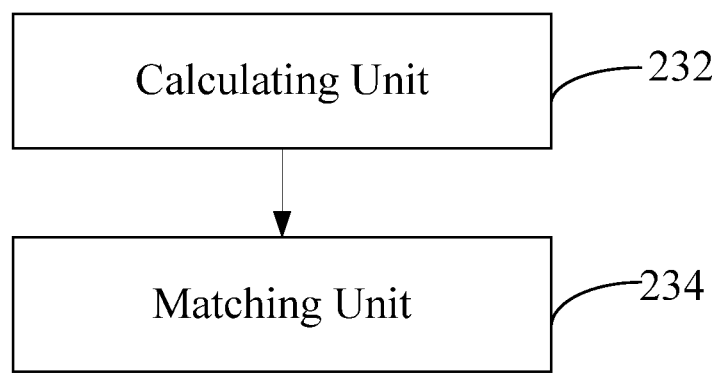
FIG. 5 is a schematic diagram of a matching module in one embodiment of the present disclosure.

The distance between the first terminal and the second terminal, and orientation relationship thereof are calculated according to the first location of the first terminal and the second location of the second terminal. Then determine if the distance and the orientation meet preset requirements. If the distance and orientation relationship meet the preset requirements, it is determined that the second terminal successfully matches the first terminal. Referring to FIG. 5, the matching module 230 includes a calculating unit 232 and a matching unit 234. The calculating unit 232 is configured to calculate the distance between the first terminal and the second terminal, and orientation relationship thereof according to the first location and the second location. If the distance and the orientation meet preset requirements, the matching unit 234 will determine that the second terminal successfully matches the first terminal. In this embodiment, the preset requirements include that the distance meets a first preset value, and the first preset value may be determined by distance information. The distance information may include two digital distance information of the start and end points. The preset requirements further include that deviation of the position of the second terminal to the orientation of the first terminal meets a second preset value.

The first preset value and the second preset value may be predetermined, or automatically adjusted according to the tilt angle of the first terminal or camera parameters (for example, focal length, field angle, etc.) of the first terminal (for wide-angle lens, the second preset value may be adjusted to be larger; if the first terminal switches from vertical orientation to horizontal orientation, then the first preset value may be adjusted to be smaller, while the second preset value to be larger), or according to a combination of the tilt angle and camera parameters of the first terminal. This is similar to custom setting by the user according to actual needs. The preset requirement can only include that deviation of the position of the second terminal to the orientation of the first terminal meets a second preset value.

For example, when it determined that the first terminal is facing north, and the deviation of the position of the second terminal to the orientation of the first terminal, i.e., the second preset value, is 30°, then second terminals that are located within the range of 30° north by east and 30° north by west will be determined as successfully matched second terminals. The following examples illustrate the cases when the distance meets the first preset value, and the deviation of the position of the second terminal to the orientation of the first terminal meets the second preset value. As shown in FIG. 2, in real world, the first terminal is located at a point A and facing north. The second terminal B is located at a point B; the distance between A and B is 170 m, and B is in the direction of 30° north by west. The second terminal C is located at a point C; the distance between A and C is 80 m, and C is in the direction of 15° north by east. The second terminal D is located at a point D; the distance between A and D is 20 m, and D is in the direction of 80° north by west. The second terminal E is located in point E; the distance between A and E is 120 m, and E is in the direction of 70° north by east.

It can be seen that the deviation of B to the orientation of the first terminal is 30°, the deviation of C to the orientation of the first terminal is 15°, the deviation of D to the orientation of the first terminal is 80°, and the deviation of E to the orientation of the first terminal is 70°. When the first preset value is 200 m, and the second preset value is 35°, it can be calculated that the distance and orientation deviation of the second terminals B and C to the first terminal meet the preset requirements, and thus the second terminals B and C successfully matches the first terminal. By filtering rules set according to preset requirements, the second terminals are filtered, with nearby second terminals meeting the requirements displayed. This ensures as much as possible that second terminals within the range of the real image will be determined as successfully matched second terminals.

The displaying module 240 is configured to display information of successfully matched second terminal on the image of real scene photographed by the first terminal;

Information of the second terminal successfully matching the first terminal is displayed on the image of real scene. By the above filtering and matching process, second terminals that meet the preset requirements are displayed on the image. This avoids the situation that a page is filled with a huge amount of information, thus improves system operation speed and saves network data flow. The displaying module 240 includes a relative position corresponding unit, which is configured to display the information of the second terminals on the image according to the distance between the second terminals and the first terminal, such that relative positions of the information of the second terminals displayed on the image correspond with the second locations of the second terminals in real world. This may facilitate the user in quickly getting the position of the second terminals in real world. It is possible to distribute the information of the second terminals on the image in a way corresponding to the relationship of distance and angular deviation between the second terminals and the first terminal, with the central point of the image set as basic point, when the relationship between the second location of the second terminal and the first location of the first terminal meets the distance requirement set by a first preset value, and the deviation of the second location of the second terminal to the orientation of the first terminal meets a second preset value. In other embodiments, when there is only the requirement that the deviation to the orientation to the first terminal meets a second preset value, the information of the second terminals displayed on the image will only have to correspond to the relationship of angular deviation. The following examples illustrate the cases when the distance meets the first preset value, and the deviation to the orientation of the first terminal meets the second preset value. From FIG. 2 and the above preset requirements, it can be seen that the second terminals B and C successfully match the first terminal. FIG. 3 shows the positional relationship between the information of the second terminals B and C displayed on the image, in which point A' is the location of the first terminal, point B' is the location of the information of the second terminal B, while point C' is the location of the information of the second terminal C. The positional relationships illustrated correspond with the relative positions of the second terminals and the first terminal in real world. Furthermore, the displaying module 240 further includes a superimposition unit, by which information of different second terminals may be superimposed onto the image of the real scene in layers, which may overlapped according to the different distances, with information of the second terminal closer to the first terminal positioned as upper layer, and information of the second terminal further from the first terminal positioned as lower layer. This enhances the AR effect, and also provides convenience to subsequent operations. In other embodiments, when the image processing capacity meets requirements, information of different second terminals may be embedded directly into the image.

The interacting module 250 is configured to perform interaction with the second terminal according to the displayed information of the second terminal.

The user may select the second terminal to interact with according to the displayed information of the second terminals, including avatar, distance, updates and location, etc. Then, the user may have group activities conveniently and quickly by clicking the avatar of the second terminal, concerning about recent updates of the second terminal, leaving a message or having voice conversation, or viewing the frequent contacting second terminal nearby, so as to set up groups. Upon receiving the command from the user, the interacting module 250 can send text, voice, and video or image message to the corresponding second terminal, so as to realize interaction.

By the above method and system, an image is formed by photographing a real scene, and information of the successfully matched second terminal is displayed on the image; then interactions are performed according to needs. By displaying virtual second terminals on the image of the real scene in accordance with their geographical locations in the real world, interaction with the second terminals is facilitated. Thus, a user can communicate with a surrounding user holding a second terminal, and also obtain the specific geographical position of the second terminal. Fox example, in the team activity, a user will be able to chat with other users holding the second terminals, and to know about the positions of other users in real time, so as to facilitate unified action.

The embodiments are chosen and described in order to explain the principles of the disclosure and their practical application so as to allow others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

The invention claimed is:

1. A method for performing interaction based on augmented reality, comprising:
    at a first mobile terminal having a camera:
        obtaining an image of a real scene photographed by the camera of the first mobile terminal;
        obtaining a first location of the first mobile terminal, the first location comprising geographical coordinate and orientation of the first mobile terminal;
        searching for a second mobile terminal within a first threshold distance of the first location using data from a back-end database;
        obtaining, without communicating with the second mobile terminal, a second location of the second mobile terminal using the data from the back-end database, the second location being within the first threshold distance of the first location;

determining that the second mobile terminal successfully matches the first mobile terminal without communicating with the second terminal when: (i) a distance between the first location of the first mobile terminal and the second location of the second mobile terminal satisfies a second threshold distance less than the first threshold distance, and (ii) the second location of the second mobile terminal is within a threshold field angle of the camera of the first mobile terminal, wherein the second threshold distance and the threshold field angle are automatically adjusted in accordance with a tilt angle and camera parameters of the first mobile terminal; and in response to determining that the second mobile terminal successfully matches the first mobile terminal:

displaying, on the image of the real scene photographed by the camera of the first mobile terminal, information of the second mobile terminal, the information including one or more of avatar, the distance between the first location of the first mobile terminal and the second location of the second mobile terminal, updates, and the second location of the second mobile terminal; and performing a respective interaction according to the displayed information of the second mobile terminal, the respective interaction including sending text, voice, video, and/or image message by the first mobile terminal to the second mobile terminal upon receiving a command from a user selecting the second mobile terminal.

2. The method of claim 1, wherein displaying, on the image of the real scene photographed by the first mobile terminal, the information of the second mobile terminal comprises:

displaying, on the image, the information of the second mobile terminal in accordance with a locational and orientational relationship between the second mobile terminal and the first mobile terminal, and enabling a location of the information of the second mobile terminal displayed on the image to be in accordance with the second location of the second mobile terminal in a real world.

3. The method of claim 2, wherein displaying the information of the second mobile terminal further comprises:

superimposing, in layers, the information of the second mobile terminal onto the image of the real scene.

4. The method of claim 1, wherein:

when the first mobile terminal has a vertical orientation, the second threshold distance has a first magnitude and the threshold field angle of the camera has a second magnitude;

when the first mobile terminal has a horizontal orientation, the second threshold distance has a third magnitude and the threshold field angle of the camera has a fourth magnitude;

the third magnitude is less than the first magnitude; and the fourth magnitude is greater than the second magnitude.

5. A system for performing interaction based on augmented reality, comprising:

one or more processors;

memory coupled to the one or more processors; and a plurality of machine executable computer instructions stored in the memory, wherein the plurality of machine executable computer instructions, when executed by the one or more processors, cause the system to:

obtain an image of a real scene photographed by a camera of a first mobile terminal;

obtain a first location of the first mobile terminal, the first location comprising geographical coordinate and orientation of the first mobile terminal;

search for a second mobile terminal within a first threshold distance of the first location using data from a back-end database;

obtain, without communicating with the second mobile terminal, a second location of the second mobile terminal using the data from the back-end database, the second location being within the first threshold distance of the first location;

determine that the second mobile terminal successfully matches the first mobile terminal without communicating with the second mobile terminal when: (i) a distance between the first location of the first mobile terminal and the second location of the second mobile terminal satisfies a second threshold distance less than the first threshold distance, and (ii) the second location of the second mobile terminal is within a threshold field angle of the camera of the first mobile terminal, wherein the second threshold distance and the threshold field angle are automatically adjusted in accordance with a tilt angle and camera parameters of the first mobile terminal;

in response to determining that the second mobile terminal successfully matches the first mobile terminal:

display, on the image of the real scene photographed by the camera of the first mobile terminal, information of the second mobile terminal, the information including one or more of avatar, the distance between the first location of the first mobile terminal and the second location of the second mobile terminal, updates, and the second location of the second mobile terminal; and perform a respective interaction according to the displayed information of the second mobile terminal, the respective interaction including sending text, voice, video, and/or image message by the first mobile terminal to the second mobile terminal upon receiving a command from a user selecting the second mobile terminal.

6. The system of claim 5, wherein the system is further configured to:

display the information of the second mobile terminal on the image according to a locational and orientational relationship between the second mobile terminal and the first mobile terminal, and enable a location of the information of the second mobile terminal displayed on the image to be in accordance with the second location of the second mobile terminal in a real world.

7. The system of claim 6, wherein the system is further configured to:

superimpose, in layers, the information of the second mobile terminal onto the image of the real scene.

* * * * *